(12) United States Patent
Miller (10) Patent No.: US 11,113,881 B2
(45) Date of Patent: Sep. 7, 2021

(54) SYSTEMS AND METHODS FOR GENERATING A THREE-DIMENSIONAL SURFACE FROM A SEGMENTED VOLUME

(71) Applicant: St. Jude Medical, Cardiology Division, Inc., St. Paul, MN (US)

(72) Inventor: Frank Miller, Roseville, MN (US)

(73) Assignee: ST JUDE MEDICAL, CARDIOLOGY DIVISION, INC., St. Paul, MN (US)

( * ) Notice: Subject to any disclaimer, the term of this patent is extended or adjusted under 35 U.S.C. 154(b) by 0 days.

(21) Appl. No.: 16/991,134

(22) Filed: Aug. 12, 2020

(65) Prior Publication Data

US 2021/0074060 A1   Mar. 11, 2021

Related U.S. Application Data

(60) Provisional application No. 62/896,834, filed on Sep. 6, 2019.

(51) Int. Cl.
| | |
|---|---|
| *G06T 17/20* | (2006.01) |
| *G06T 15/50* | (2011.01) |
| *G06T 1/20* | (2006.01) |
| *G06T 19/20* | (2011.01) |

(52) U.S. Cl.
CPC .............. *G06T 17/205* (2013.01); *G06T 1/20* (2013.01); *G06T 15/503* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 7,069,149 | B2 | 6/2006 | Goff et al. |
| 7,379,572 | B2 | 5/2008 | Yoshida et al. |
| 7,486,811 | B2 | 2/2009 | Kaufman et al. |
| 8,768,022 | B2 | 7/2014 | Miga et al. |
| 9,042,613 | B2 | 5/2015 | Spilker et al. |
| 9,672,617 | B2 | 6/2017 | Dean et al. |
| 9,785,746 | B2 | 10/2017 | Fonte et al. |

*Primary Examiner* — Vu Nguyen
(74) *Attorney, Agent, or Firm* — Armstrong Teasdale LLP (57) ABSTRACT

Systems and methods for generating a three-dimensional surface from a segmented volume including a plurality of voxels are provided. The method includes executing a first pass over a plurality of cells to generate a list of active cells, and executing a second pass over the plurality of active cells to generate a quadrilateral mesh, the quadrilateral mesh including a plurality of points that define a plurality of quadrilaterals. The method further includes executing at least one additional pass over the quadrilateral mesh to generate a smoothed mesh, wherein executing the at least one additional pass includes computing, for at least one point, a balanced curvature for the at least one point based on curvatures at points that neighbor the at least one point and moving the at least one point to a new location based on the computed balanced curvature. The method further includes displaying the smoothed mesh.

20 Claims, 9 Drawing Sheets

SYSTEMS AND METHODS FOR GENERATING A THREE-DIMENSIONAL SURFACE FROM A SEGMENTED VOLUME

CROSS REFERENCE TO RELATED APPLICATIONS

This application claims the benefit of priority to U.S. provisional application Ser. No. 62/896,834, filed Sep. 6, 2019, which is incorporated herein by reference in its entirety.

FIELD OF THE DISCLOSURE

The present disclosure relates generally to medical image segmentation. In particular, the present disclosure relates to generating a smoothed three-dimensional mesh surface from a segmented volume.

BACKGROUND

It is known that various computer-based systems and computer-implemented methodologies can be used to generate multi-dimensional surface models of geometric structures, such as, for example, anatomic structures. More specifically, a variety of systems and methods have been used to generate multi-dimensional surface models of the heart and/or particular portions thereof. These models are useful to clinicians, as patient specific anatomy may be used to guide procedures (e.g., electrophysiology (EP) procedures).

Medical image segmentation is the process of extracting anatomical regions from volumetric images. The volumetric images may be created using, for example, magnetic resonance imaging (MRI), computed tomography (CT), ultrasound, or another suitable imaging device. As used herein, a volumetric image is a three-dimensional array of samples positioned in space, and each sample is called a voxel. When segmenting volumetric images, one technique to represent the results of a segmentation is by using an additional volumetric image, where each voxel in the additional volumetric image is replaced with an integral value that encodes the extracted anatomical region.

An important feature of any system that performs medical image segmentation is the ability to visualize (i.e., display) a segmented volume. However, rendering a segmented volume may introduce aliasing artifacts that cause surfaces to appear sharp or jagged, instead of smooth. Accordingly, it would be desirable to rapidly and efficiently convert a segmented volume stored in memory into a data structure that can be easily rendered with a smooth surface by a computing device.

BRIEF SUMMARY OF THE DISCLOSURE

In one embodiment, the present disclosure is directed to a method for generating a three-dimensional surface from a segmented volume including a plurality of voxels, the segmented volume divided into a plurality of overlapping cells that each include a plurality of neighboring voxels. The method includes executing, using a computing device, a first pass over the plurality of cells to generate a list of active cells, and executing, using the computing device, a second pass over the plurality of active cells to generate a quadrilateral mesh, the quadrilateral mesh including a plurality of points that define a plurality of quadrilaterals, each of the plurality of points located within a corresponding active cell. The method further includes executing, using the computing device, at least one additional pass over the quadrilateral mesh to generate a smoothed mesh, wherein executing the at least one additional pass includes computing, for at least one point of the plurality of points, a balanced curvature for the at least one point based on curvatures at points that neighbor the at least one point and moving the at least one point to a new location based on the computed balanced curvature. The method further includes displaying, using the computing device, the smoothed mesh.

In another embodiment, the present disclosure is directed to a computing device for generating a three-dimensional surface from a segmented volume including a plurality of voxels, the segmented volume divided into a plurality of overlapping cells that each include a plurality of neighboring voxels. The computing device includes a memory device, and a processor communicatively coupled to the memory device. The processor is configured to execute a first pass over the plurality of cells to generate a list of active cells, and execute a second pass over the plurality of active cells to generate a quadrilateral mesh, the quadrilateral mesh including a plurality of points that define a plurality of quadrilaterals, each of the plurality of points located within a corresponding active cell. The processor is further configured to execute at least one additional pass over the quadrilateral mesh to generate a smoothed mesh, wherein executing the at least one additional pass includes computing, for at least one point of the plurality of points, a balanced curvature for the at least one point based on curvatures at points that neighbor the at least one point, and moving the at least one point to a new location based on the computed balanced curvature. The method is further configured to display, on the computing device, the smoothed mesh.

In yet another embodiment, the present disclosure is directed to non-transitory computer-readable media having computer-executable instructions thereon. When executed by a processor of a computing device, the computer-executable instructions cause the processor of the computing device to execute a first pass over a plurality of overlapping cells in a segmented volume to generate a list of active cells, each cell including a plurality of neighboring voxels, and execute a second pass over the plurality of active cells to generate a quadrilateral mesh, the quadrilateral mesh including a plurality of points that define a plurality of quadrilaterals, each of the plurality of points located within a corresponding active cell. The instructions further case the processor to execute at least one additional pass over the quadrilateral mesh to generate a smoothed mesh, wherein executing the at least one additional pass includes computing, for at least one point of the plurality of points, a balanced curvature for the at least one point based on curvatures at points that neighbor the at least one point, and moving the at least one point to a new location based on the computed balanced curvature. The instructions further cause the processor to display, on the computing device, the smoothed mesh.

The foregoing and other aspects, features, details, utilities and advantages of the present disclosure will be apparent from reading the following description and claims, and from reviewing the accompanying drawings.

DETAILED DESCRIPTION OF THE DISCLOSURE

The present disclosure provides systems and methods for generating a three-dimensional surface from a segmented volume including a plurality of voxels, the segmented volume divided into a plurality of overlapping cells that each include a plurality of neighboring voxels. The method includes executing a first pass over the plurality of cells to generate a list of active cells, and executing a second pass over the plurality of active cells to generate a quadrilateral mesh. The quadrilateral mesh includes a plurality of points that define a plurality of quadrilaterals. The method further includes executing at least one additional pass over the quadrilateral mesh to generate a smoothed mesh. Executing the at least one additional pass includes computing, for at least one point, a balanced curvature for the at least one point based on curvatures at points that neighbor the at least one point, and moving the at least one point to a new location based on the computed balanced curvature. The method further includes displaying the smoothed mesh.

The systems and methods described herein facilitate rapidly converting a segmented volume (e.g., stored in a graphics processing unit (GPU) memory unit) into a polygonal mesh data structure. The polygonal mesh data structure that is generated smoothly wraps every contiguous three-dimensional region in the segmented volume, and is easily renderable for display using a GPU graphics application programming interface (API).

Figure 1:
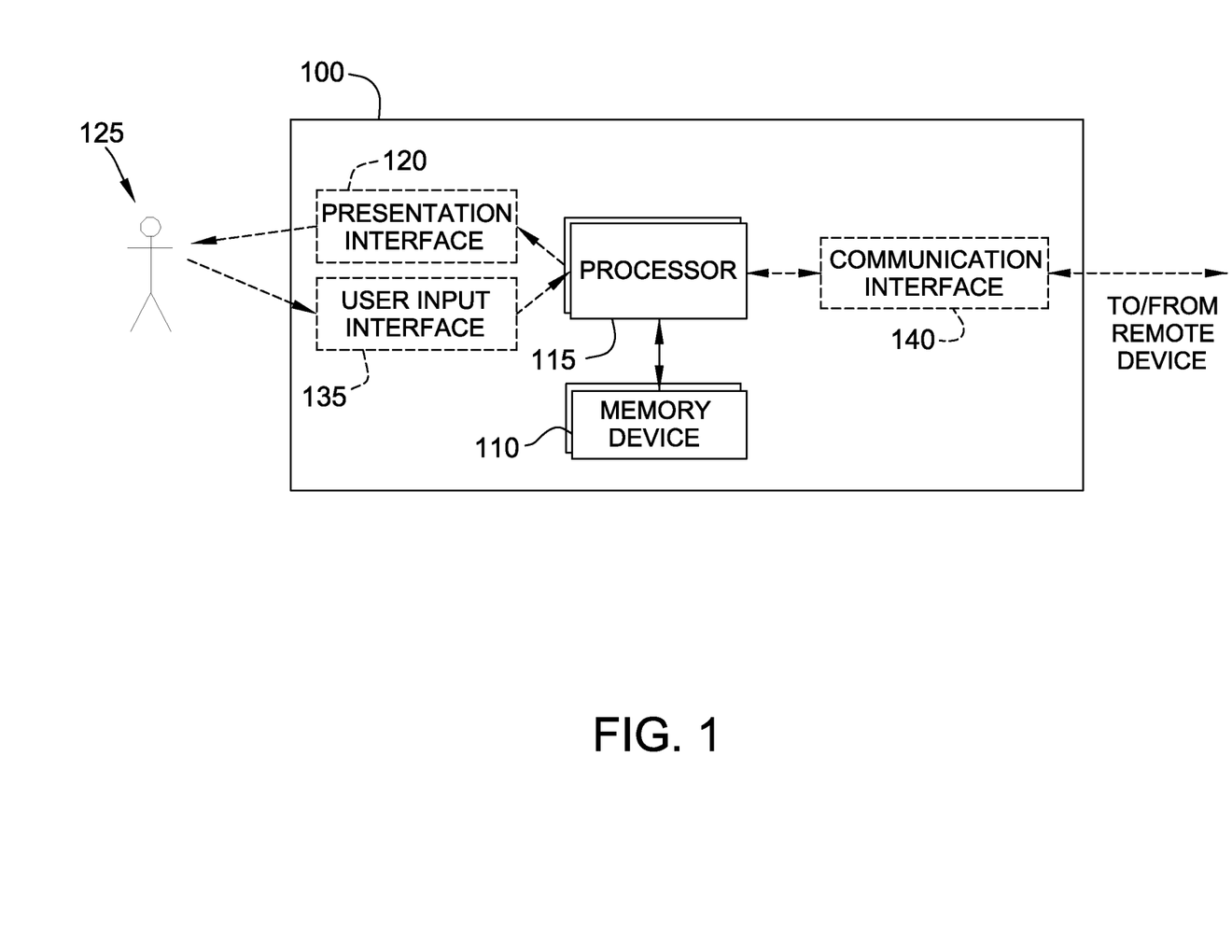
FIG. 1 is a block diagram of one embodiment of a computing device that may be used to implement the systems and methods described herein.

Referring now to the drawings wherein like reference numerals are used to identify identical components in the various views, FIG. 1 illustrates one embodiment of a computing device 100 that may be used to implement the systems and methods described herein. Computing device 100 includes at least one memory device 110 and a processor 115 that is coupled to memory device 110 for executing instructions. In some embodiments, executable instructions are stored in memory device 110. In this embodiment, computing device 100 performs one or more operations described herein by programming processor 115. For example, processor 115 may be programmed by encoding an operation as one or more executable instructions and by providing the executable instructions in memory device 110.

Processor 115 may include one or more processing units (e.g., in a multi-core configuration). Further, processor 115 may be implemented using one or more heterogeneous processor systems in which a main processor is present with secondary processors on a single chip. In another illustrative example, processor 115 may be a symmetric multi-processor system containing multiple processors of the same type. Further, processor 115 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In one embodiment, processor 115 is a GPU (as opposed to a central processing unit (CPU)). Alternatively, processor 115 may be any processing device capable of implementing the systems and methods described herein.

In this embodiment, memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, application source code, application object code, source code portions of interest, object code portions of interest, configuration data, execution events and/or any other type of data. In one embodiment, memory device 110 is a GPU memory unit. Alternatively, memory device 110 may be any storage device capable of implementing the systems and methods described herein.

In this embodiment, computing device 100 includes a presentation interface 120 that is coupled to processor 115. Presentation interface 120 presents information to a user 125. For example, presentation interface 120 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 120 includes one or more display devices. Input signals and/or filtered signals processed using the embodiments described herein may be displayed on presentation interface 120.

In this embodiment, computing device 100 includes a user input interface 135. User input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 120 and user input interface 135.

Computing device 100, in this embodiment, includes a communication interface 140 coupled to processor 115. Communication interface 140 communicates with one or more remote devices. To communicate with remote devices, communication interface 140 may include, for example, a wired network adapter, a wireless network adapter, and/or a mobile telecommunications adapter.

As described in detail herein, computing device 100 executes an algorithm to convert a segmented volume stored in GPU memory (e.g., memory device 115) into a single quadrilateral mesh containing surfaces that smoothly surround each contiguous three-dimensional region in the segmented volume. Surfaces at an interface between two regions are non-redundantly represented with a single surface.

As described herein, the algorithm is designed to execute in parallel on a GPU (e.g., processor 115), generate surfaces around multiple regions simultaneously, and use local curvature to produce smoother surfaces in addition to using elastic relaxation. The algorithm runs relatively quickly when executed using a graphics card. Specifically, segmented volume data remains in the GPU memory and the resulting mesh is rendered at a rate of at least 60 frames per second (FPS). The surfaces in the displayed model are smooth with most aliasing artifacts removed, and with sufficient resolution such that single, isolated voxels are distinguishable.

In the embodiments described herein, the quadrilateral mesh is represented as an array of points, and an array of quadrilaterals each indexing four of the points. Each point has an associated normal vector, and the front (i.e., outward facing) and back (i.e., inward facing) faces of each quadrilateral are associated with a value from the segmented volume.

Figure 2:
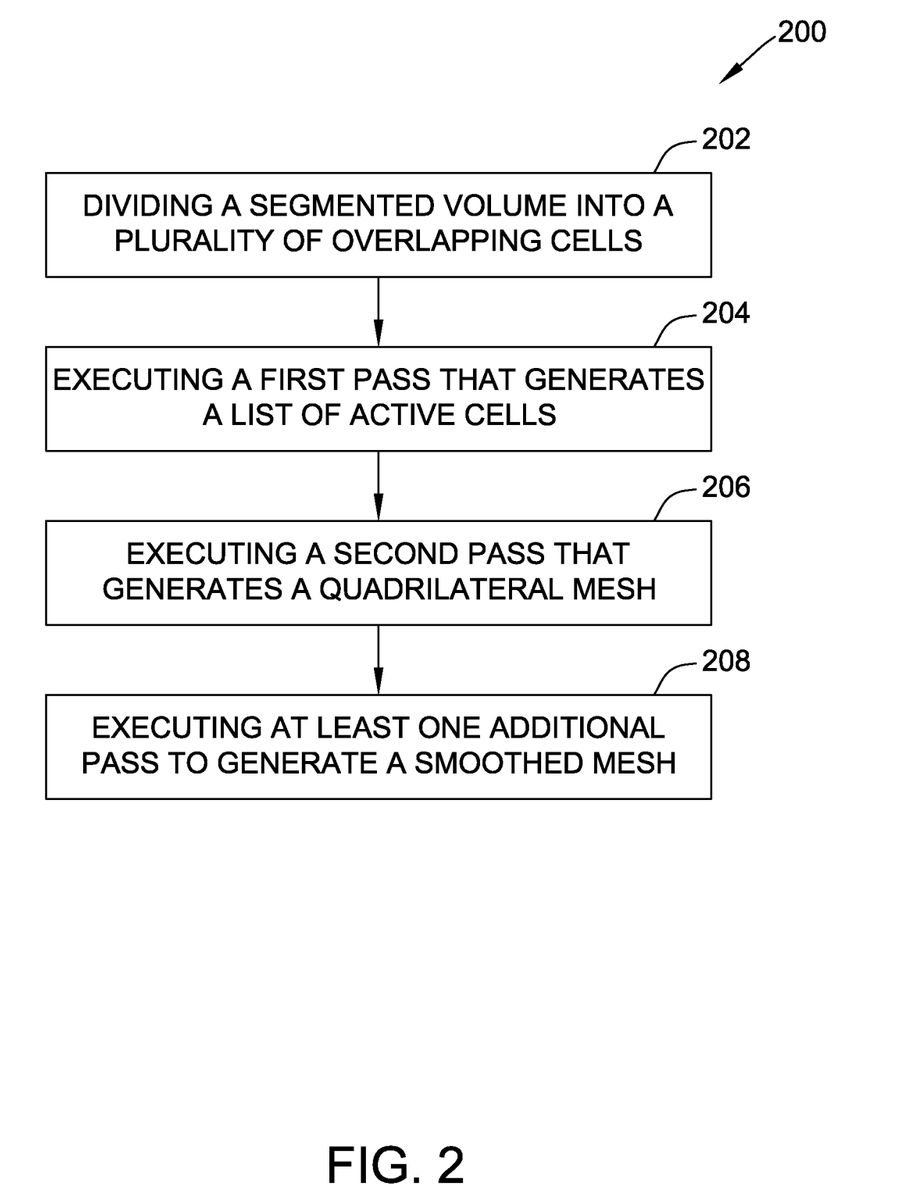
FIG. 2 is a block diagram of a method of generating a three-dimensional surface from a segmented volume including a plurality of voxels.
Figure 3:
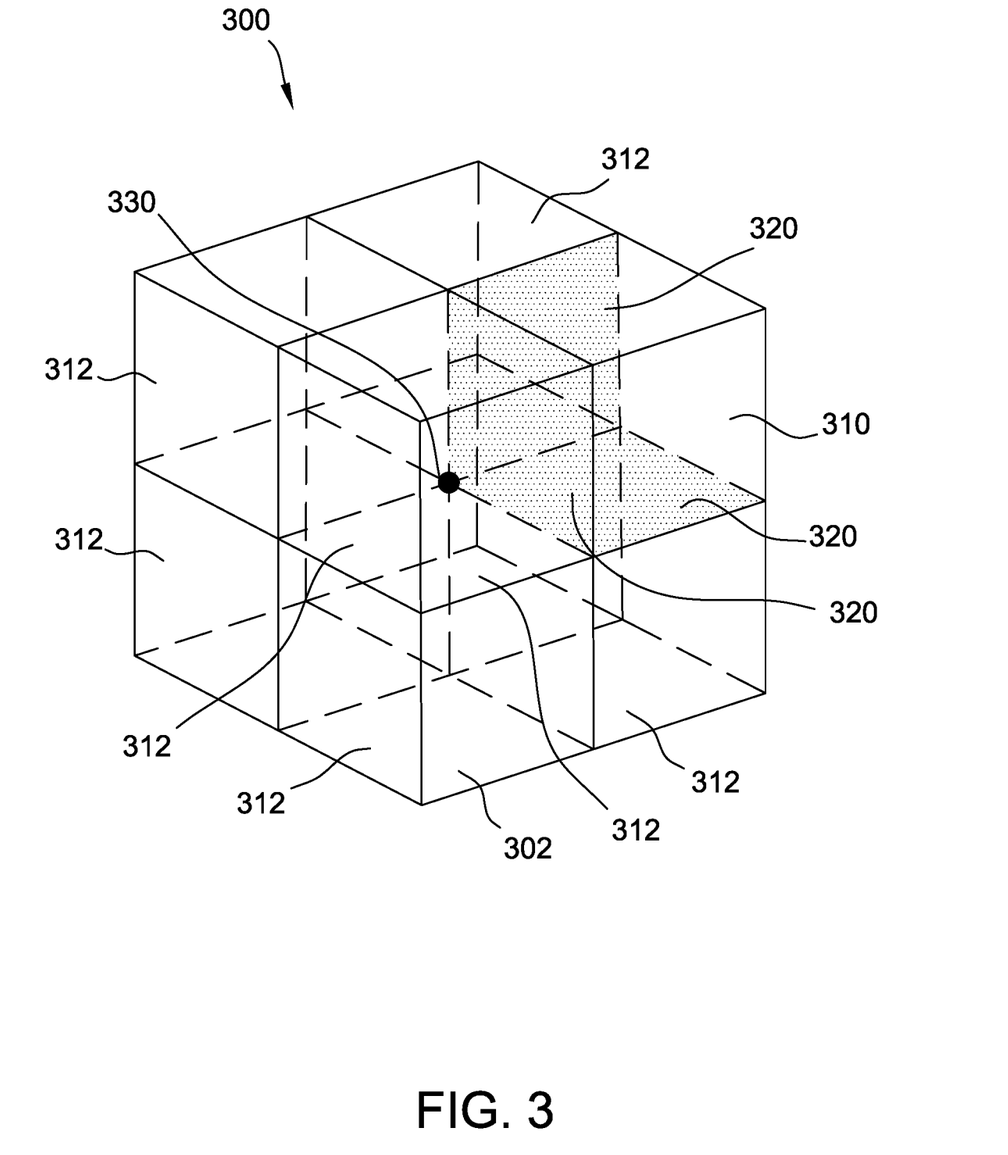
FIG. 3 is a diagram of a cell including eight neighboring voxels.

FIG. 2 is a block diagram of a method 200 of generating a three-dimensional surface from a segmented volume including a plurality of voxels. An exemplary three-dimensional surface 806 generated using method 200 is described further herein with respect to FIG. 8C. Method 200 may be implemented, for example, by computing device 100 (shown in FIG. 1). Method 200 includes dividing 202 the segmented volume into a plurality of overlapping cells. Each cell includes eight neighboring voxels in this embodiment, as described below (and as shown in FIG. 3). Alternatively, each cell may include a different number of neighboring voxels. Each voxel has a binary value that indicates whether or not the voxel is outside of a region in the volume. For example, in one embodiment, voxels outside of the volume have a volume of 0 and voxels not outside of the volume have a volume of 1.

For a given cell, if all eight voxels have the same binary value, than the cell lies entirely inside the region or outside the region. Otherwise, if all eight voxels do not have the same binary value, the cell is an active cell that lies on the surface of the region. Because the active cell lies on the surface of the region, it will contribute one point and zero to three quadrilaterals to the surface, as described below in conjunction with FIG. 3.

Method 200 includes multiple passes to generate the final three-dimensional surface. Specifically, method 200 includes executing 204 a first pass that visits all the cells in the volume and generates a list of the active cells, allocating a unique index for each active cell. The unique index corresponds to the location of a generated point and normal vector in their respective arrays, as described herein.

Method 200 further includes executing 206 a second pass that visits the active cells (identified from the first pass) and generates a quadrilateral mesh with additional topographical information. Further, method 200 includes executing 208 at least one additional pass over the mesh to generate a smoothed mesh. During the at least one additional pass, point positions and normal vectors are iteratively adjusted to generate smoother surfaces using the topological information generated in the second pass.

Method 200 further includes displaying 210 a three-dimensional model based on the smoothed mesh. The model may be displayed, for example, on presentation interface 220.

Method 200 utilizes a number data structures to generate and display a three-dimensional model from a segmented volume including a plurality of voxels. Those data structures will now be described in detail.

Point Stamp

A sample in a regularly sampled three-dimensional array (e.g., a volumetric image) can be referenced using three integers. If 8-bit integers are used, the largest volume that can be indexed is 256×256×256, which may not be sufficiently large for some applications. In contrast, if 16-bit integers are used, the largest volume that can be indexed is 25536×25536×25536, which is relatively large compared to what is commonly needed.

A 'point stamp', as used herein, refers to three integers of the sample index. The three integers may be stored in a single 32-bit unsigned integer by encoding the first two indices in the first and second 11 bits, respectively, and encoding the third index in the last 10 bits. The largest volume that can be indexed is 2048×2048×1024. It is relatively common for the size of a medical image to be smaller in the third dimension, so this is a reasonable compromise to save memory. However, in some embodiments, for higher resolution images, the algorithm may be updated to use three 16-bit integers instead.

Quad Mesh

As used herein, a 'quad mesh' is the main output data structure of the algorithm. The quad mesh is a quadrilateral mesh that includes i) pointCount (a 32-bit unsigned integer representing the number of points in the mesh), ii) quadCount (a 32-bit unsigned integer representing the number of quadrilaterals in the mesh), iii) pointList (a one-dimensional array of three-dimensional floating point vectors of size pointCount), iv) normalList (a one-dimensional array of three-dimensional floating point vectors of size pointCount), v) quadList (a one-dimensional array of 4-tuples of 32-bit signed integers of size quadCount), and vi) attributeList (a one-dimensional array of 2-tuples of the same type as the input segmented volume of size quadCount).

The pointList is a list of points on the surface of the mesh. Each point has a corresponding surface normal vector at the same index in the normalList. The quadList is an array of indices of 4-tuples of indices of points in the pointList that form a quadrilateral (also referred to as a quad) in the mesh. Each quad in the quadList has an attribute at the same index in the attributeList that includes the values from the segmented value on the front and back face of the quad. The front and back face of a quad may be determined, for example, by the order of the indexed points. For example, a given quad can be subdivided into two triangles by connecting one of the two pairs of opposite corners with a line. For instance, if a quad has points p1, p2, p3, and p4, indexed in that order, then one can form two triangles: i) p1, p2, p4 and ii) p2, p3, p4. When rendering each triangle on a display, the projected points, when traversed in order, will either form a clockwise loop or a counter-clockwise loop. If the loop is clockwise, then the front face is visible to a viewer, otherwise the back face is visible.

In this embodiment, it is not required that the quadrilateral mesh form a manifold. Further, the output from the algorithm represents surfaces at interfaces between regions as a single set of quads. This is why a single quad has an attribute associated with both its front and back faces.

Point Edge Table

As used herein, a 'point edge table' refers to a data structure that is computed in the second pass (described in detail below) and used in the at least one additional pass. Specifically, the point edge table maps each point to a list of points connected to that point by an edge in the quadrilateral mesh. The point edge table also contains a topological classification of the edges, and that topological classification influences how those edges will be used for smoothing. The point edge table includes i) pointNeighborTable and ii) pointNeighborList.

The pointNeighborTable is a one-dimensional array of 32-bit unsigned integers. Each element in the array corresponds to one point in the mesh. For each element, in one embodiment, the first 29-bits contain an index into the pointNeighborList, and the last 3-bits contain the number of neighboring points. Together, the index and the neighbor count define a contiguous region in the pointNeighborList that holds the list of neighboring points.

The pointNeighborList is also a one-dimensional array of 32-bit unsigned integers. For each element in the array, the first 30-bits of each integer contain index of a point, and the last 2-bits are a topological classification of the edge.

Given a mesh with a known number of points and quads, the exact size of pointNeighborList is not determinable. However, pointNeighborList is guaranteed to be smaller than four times the size of the quadCount (i.e. four times the number of quads in the mesh. This can be shown by noting that the size of the pointNeighborList is exactly two times the size of the edgeCount (i.e., the total number of edges in the mesh). Further, each quad includes four edges, and each edge can touch two or more quads. Accordingly, two times the edgeCount is less than or equal to four times the quadCount.

In one embodiment, the high bits (i.e., the last 2-bits) in the pointNeighborList are used to distinguish areas of the mesh that are locally a manifold from areas that are not. In this embodiment, an edge is labeled a non-manifold edge if it touches more than two quads. Further, a point is labeled a non-manifold point if two or more faces are connected by only the point (i.e., there is no path from one face to the other face that crosses only edges). This information is used to perform smoothing in the at least one additional pass, as described below in detail. In other embodiments, other smoothing techniques that use different topological information may be implemented. That topological information may be stored similarly (e.g., in the last 2-bits) without departing from the spirit and scope of this disclosure.

Point Displacement Lookup Table

During the second pass of the algorithm (described in detail below), the location of one point on the mesh is computed for each active cell. If the center of the cell is used for the point (see, e.g., point 330 in FIG. 3), the mesh exactly represents the faces of the voxels separating the segmented regions, and is thus relatively jagged. Using the following technique, a better location can be computed.

Initially, the values for each of the eight voxels in the cell are mapped to +1 or −1, depending on whether the voxel value is non-zero or zero, respectively. Then, the mapped values are used to define a scalar function using tri-linear interpolation. The point for the cell is then moved from the center to the zero-level-set with a gradient decent optimization algorithm applied to the interpolation function squared. When the point has converged, the normal for that point can be calculated as the gradient of the scalar function at that point. This produces a much smoother looking surface.

Rather than performing the gradient decent optimization algorithm for each point using the GPU, this calculation may be performed offline for all one hundred and twenty eight combinations of voxel values, with the highest voxel having a zero value. The results of the calculation may be stored in a look-up table uploaded to the GPU (and stored in memory device 150). This table is referred to herein and the "point displacement lookup table". For any given cell that has a zero value for the highest voxel, the point location for that cell can be computed relatively quickly by looking up, in the point displacement lookup table, the displacement of the point from the center. If the highest value is non-zero, all values are inverted before lookup, because the result will be the same due to symmetry.

Figure 4:
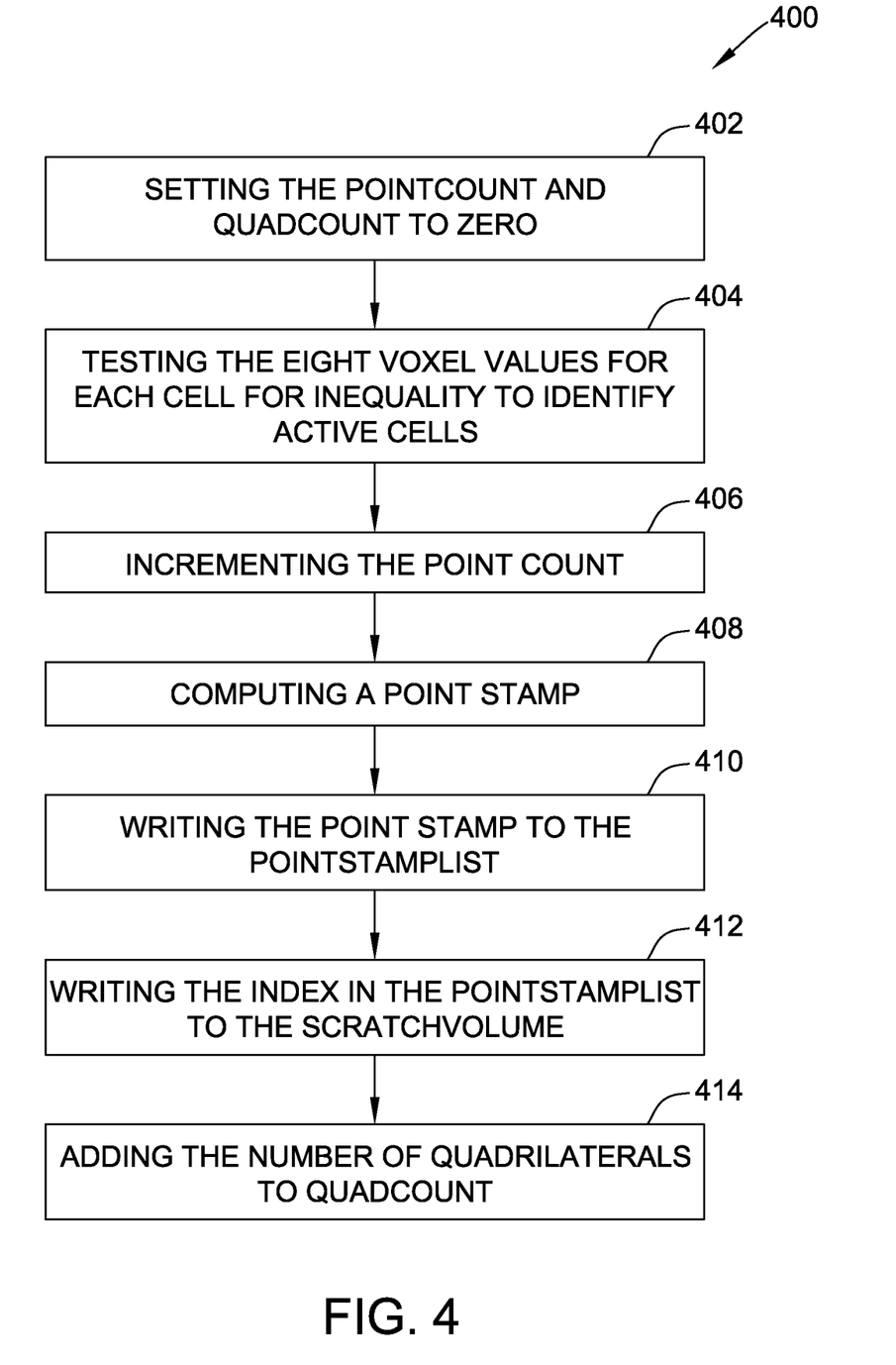
FIG. 4 is a block diagram of a method of executing a first pass in accordance with the method shown in FIG. 2.

The operation of method 200 will now be described in detail. FIG. 3 is a diagram of a cell 300 including eight neighboring voxels 302. In other embodiments, cell 300 may include an alternative number of neighboring voxels 302. Further, FIG. 4 is a block diagram of a method 400 of executing 204 a first pass.

In this embodiment, the first pass of the algorithm takes a segmentedVolume as the input, and generates a pointStampList, a scratchVolume, a pointCount, and a quadCount as outputs.

The segmentedVolume is a three-dimensional volume image, and can include any voxel type. The pointStampList is a one-dimensional array of 32-bit unsigned integers. The length of pointStampList is unknown initially, but the length should be sufficient to hold one element for each active cell. The scratchVolume is a three-dimensional volume of 32-bit unsigned integers. A size of the scratchVolume is one more than a size of the segmentedVolume in each dimension. The pointCount is one 32-bit unsigned integer that indicates the number of pointStamps added to the pointStampList. Further, the quadCount is one 32-bit unsigned integer that indicates the number of quadrilaterals that will be in the final mesh data structure.

To begin method 400, the pointCount and the quadCount are set 402 to zero. Then, for each cell in the three-dimensional volume image (e.g., cell 300), the eight voxel values for that cell are tested 404 for inequality to identify the active cells. Specifically, if all eight voxels for a cell do not have the same binary value, that cell is an active cell that lies on the surface of the region.

For each active cell, the pointCount is incremented 406 atomically. Further, the previous pointCount value is used as an index into the pointStampList unique to the particular cell. Also, a point stamp is computed 408 for each active cell, that point stamp is written 410 to its corresponding location in the pointStampList, and the index of the point stamp in the pointStampList is written 412 to the scratchVolume. Further, the number of quadrilaterals that will be added for the cell in the second pass is atomically added 414 to quadCount.

For example, cell 300 includes one external voxel 310 and seven internal voxels 312. Accordingly, cell 300 is an active cell. Further, active cell 300 may contribute any of three quadrilaterals 320 to the surface (i.e., at the interfaces between external voxel 310 and internal voxels 312). For example, if active cell 300 is external, and the remaining cells are all internal, active cell 300 will contribute exactly three quadrilaterals 320.

As noted above, initially, there is no way to know the appropriate size for the pointStampList. Accordingly, the appropriate length is initially guessed. If the length turns out to be too small, the value in pointCount will still be accurate, allowing the pointStampList to be reallocated before repeating the first pass.

In some embodiments, the algorithm may be modified to significantly reduce the required size of the scratchVolume. Specifically, instead of processing all of the cells of the volume at once, the cells may be processed in a sequence of thin slabs. Using this technique, only two scratch volumes the size of a slab would be needed.

Figure 5:
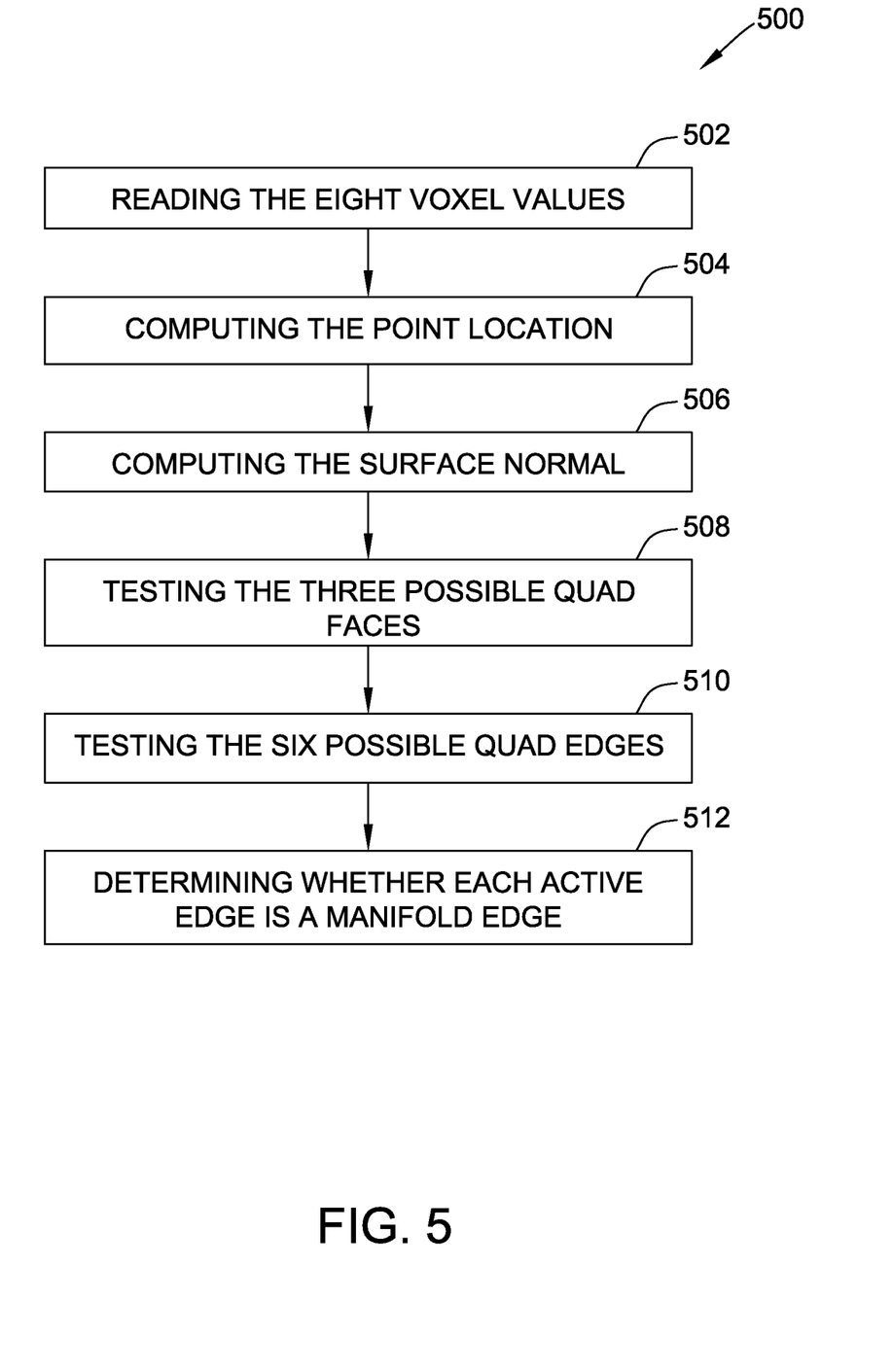
FIG. 5 is a block diagram of a method of executing a second pass in accordance with the method shown in FIG. 2.

FIG. 5 is a block diagram of a method 500 of executing 206 a second pass. In this embodiment, the second pass of the algorithm takes the segmentedVolume, the pointStampList, and the scratchVolume as inputs. Further, the second pass of the algorithm generates the quadMesh and the pointEdgeTable (both described above) as outputs. Before initiating method 500, the pointCount and the quadCount computed in the first pass are used to reallocate output data buffers if necessary to make them sufficiently large.

In method 500, for each active cell, the eight voxel values of the cell are read 502. Then, the location of the point on the mesh for that cell is computed 504 using the Point Displacement Lookup Table, as described above, and the point location is written to the corresponding location in the pointList. The surface normal is computed 506 from the gradient at the point location, and written to the corresponding location in the normalList.

The three possible quad faces for the cell are tested 508, and for each active quad (i.e., each quadrilateral that contributes to the surface), the point indices are read from the scratchVolume and atomically added to the quadList. Method 500 further includes testing 510 the six possible quad edges from the cell to neighboring cells. For each active edge (i.e., each edge that contributes to the surface), the neighboring point index is read from the scratchVolume, the edge is determined 512 to be a manifold edge or not by counting the adjacent quads, and this information is atomically added to the neighbor list. Thus, the second pass produces the quadMesh and the pointEdgeTable.

Figure 6:
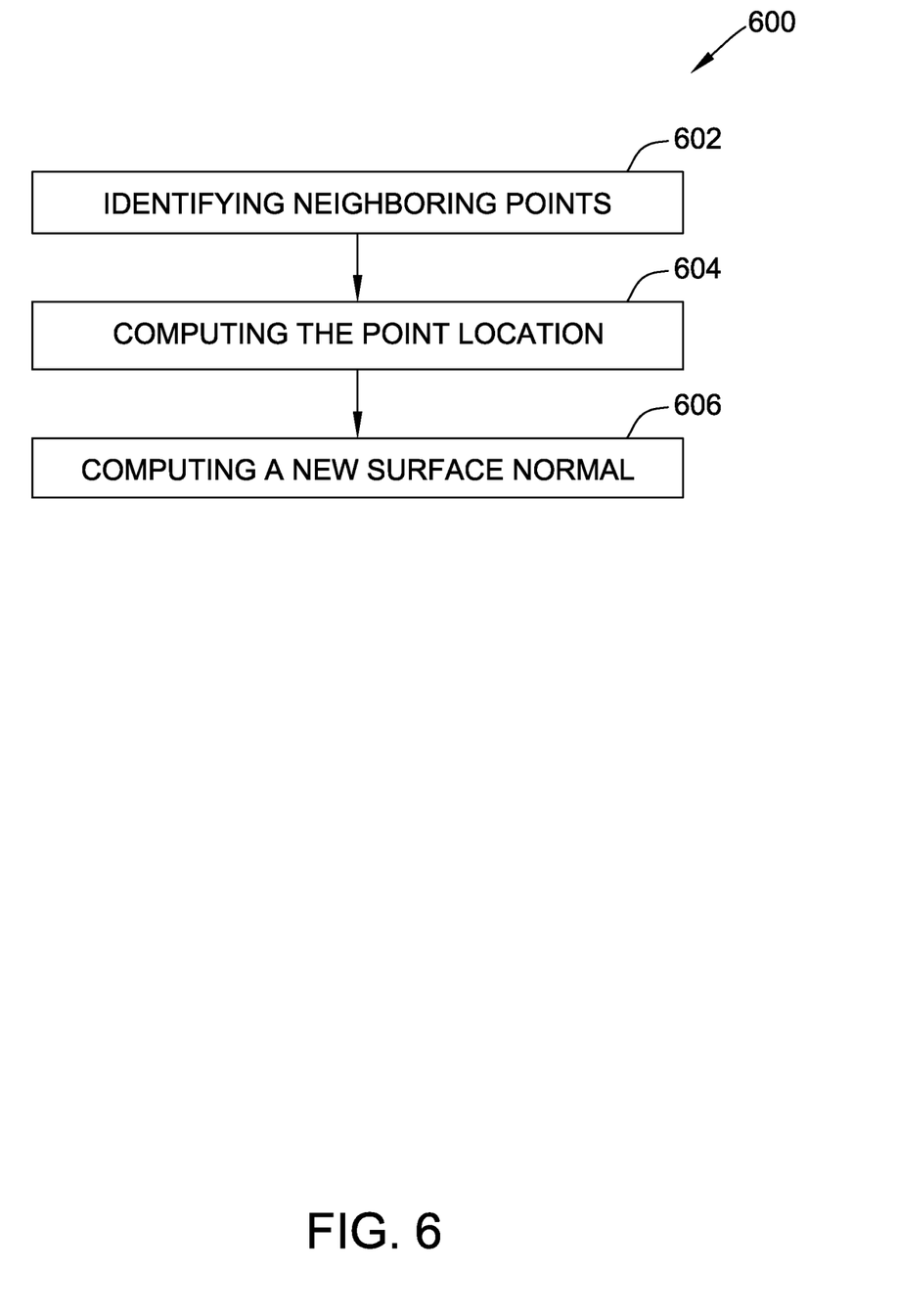
FIG. 6 is a block diagram of a method of executing at least one additional pass in accordance with the method shown in FIG. 2.

FIG. 6 is a block diagram of a method 600 of executing 208 at least one additional pass to smooth the surface of the generated quadrilateral mesh. In this embodiment, the at least one additional pass of the algorithm takes a sourcePointList, a sourceNormalList, and the pointEdgeTable as inputs. The at least one additional pass generates a targetPointList and a targetNormalList as outputs.

The sourcePointList is the pointList from the quadMesh of the second pass or the targetPointList from a previous smoothing pass. The sourceNormalList is the normalList from the quadMesh of the second pass or the targetNormalList from a previous pass. The pointEdgeTable is from the second pass. Regarding the output, the targetPointList is a new point list with the same size as the sourcePointList, and the targetNormalList is a new normal list with the same size as the sourceNormalList.

In one embodiment, the at least one additional pass is repeated several times. After each additional pass, the resulting surface should be slightly smoother. Method 600 includes, for each point on the surface, identifying 602 neighboring points using the pointNeighborList. Based on the neighboring points, for each point, a new point location is computed 604, and a new surface normal is computed 606. The new point location is constrained to remain within the boundaries of the cell that the point is associated with.

In at least some existing smoothing algorithms, a point is moved towards an average location of the neighboring points. This may be referred to as 'elastic relaxation'. Elastic relaxation is a relatively simple technique that effectively eliminates aliasing artifacts in segmented images. However, this technique, when combined with the point location constraint described above, may also introduce sharp corners and collapse thin regions, both of which are undesirable phenomena.

To avoid such issues, a point may be moved based on local curvature. For example, using at least some known curvature-based smoothing algorithms, the point may be moved in the direction of the normal at that point, scaled by the local curvature. For a closed surface, the points will tend to converge, and corners will be produced when the points are constrained to their associated cells, similar to when elastic relaxation is used. This phenomena results, at least in part, because moving a point on a convex surface inward will decrease the curvature at that point, but will also increase the curvature at neighboring points.

To prevent point convergence and generation of sharp corners, the systems and methods described herein balance the curvature at a given point with the curvature of the neighboring points. Specifically, to compute 604 a new point location, a balanced curvature for the point is computed based on the curvatures at that point and at neighboring points. The curvature at the point is adjusted by the computed balanced curvature by changing the position of the point, moving the point to the new point location. In one embodiment, the balanced curvature is computed by averaging the curvature at that point with the negative curvatures at neighboring points. Alternatively, the balanced curvature may be calculated as any suitable function of the curvatures at the neighboring points. For example, in other embodiments, principal components or least squares approaches may be used to compute surface curvature. Notably, the techniques described herein are relatively simple to implement on a GPU, such as processor 115 (shown in FIG. 1), and generate sufficient results.

In one embodiment, for a point that is attached to a non-manifold point or edge, the balanced curvature is not used to move the point. Instead, the point may be adjusted using elastic relaxation.

Figure 7:
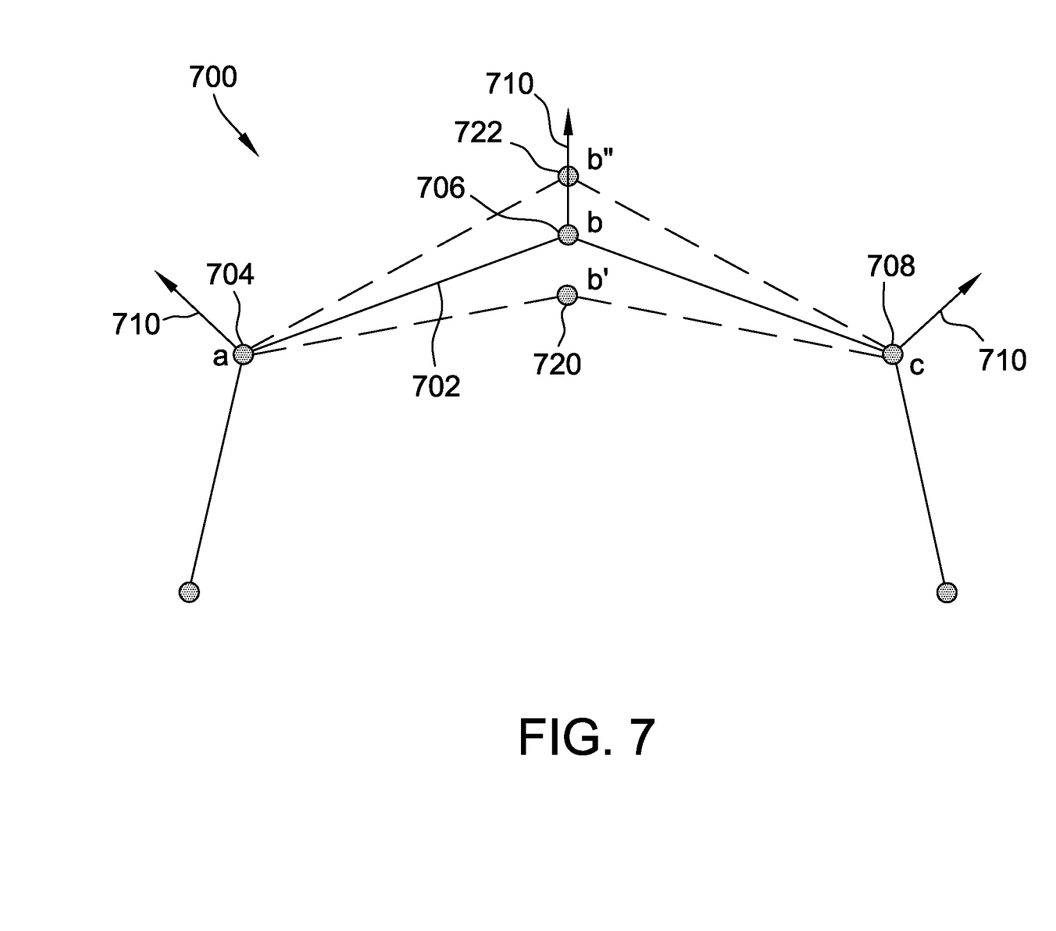
FIG. 7 is a diagram illustrating moving points based on balanced curvatures.

Computing balanced curvatures, and moving points based on the balanced curvatures facilitates reducing overall curvature of the surface while still constraining points to their respective cells. FIG. 7 is a diagram 700 illustrating the advantages of computing balanced curvatures and moving points based on those balanced curvatures. Diagram 700 shows a surface 702 with a first point 704 ($a$), a second point 706 ($b$), and a third point 708 ($c$). Each point has an associated surface normal 710.

In the example shown in diagram 700, second point 706 is the point to be moved to decrease the curvature of the surface (e.g., to smooth the surface). Using at least some known curvature-based smoothing algorithms, the curvature at second point 706 is computed and second point 706 is moved to a first updated second point location 720 (b'). As shown in FIG. 7, this reduces the curvature at second point 706, but increases the curvature at first point 704 and third point 708.

In contrast, using a balanced curvature approach, the curvature at second point 706 is adjusted by the negative average of the curvature at first point 704 and third point 708. This results in second point 706 moving to a second updated point location 722 (b"). Notably, this increases the curvature at second point 706, but decreases the curvature at first point 704 and third point 708 for a net benefit.

As one example, mathematically, the normal curvature of a surface at a point $p_i$ with a surface normal $n_i$ in the direction of a neighboring point $p_{ij}$ can be computed by the following Equation 1:

$$\kappa_{ij} = \frac{2n_i \cdot (p_i - p_j)}{|p_i - p_j|^2} \quad \text{(Equation 1)}$$

Further, if $N_i$ represents the set of indices of points neighboring the point $p_i$ and $|N_i|$ is the number of neighboring points, then the neighborhood curvature at point $p_i$ can be computed by the following Equation 2:

$$K_i = \frac{\sum_{j \in N_i} \kappa_{ij} - \kappa_{ji}}{2|N_i|} \quad \text{(Equation 2)}$$

Figure 8A:
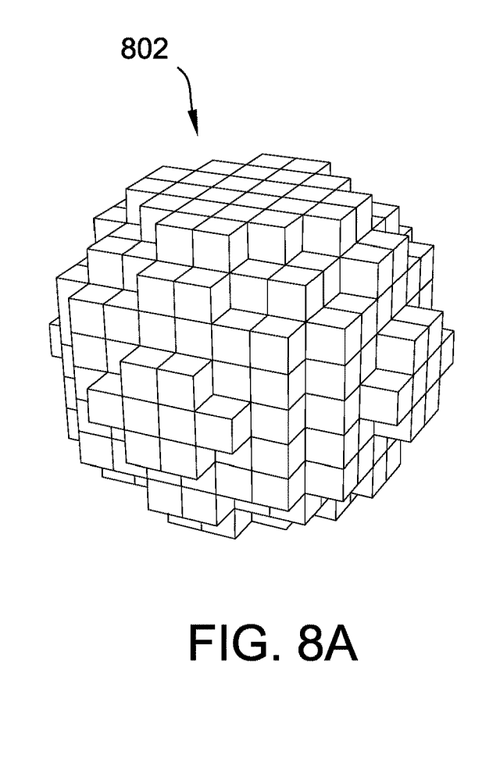
FIGS. 8A-8C illustrate operation of the method shown in FIG. 2.
Figure 8B:
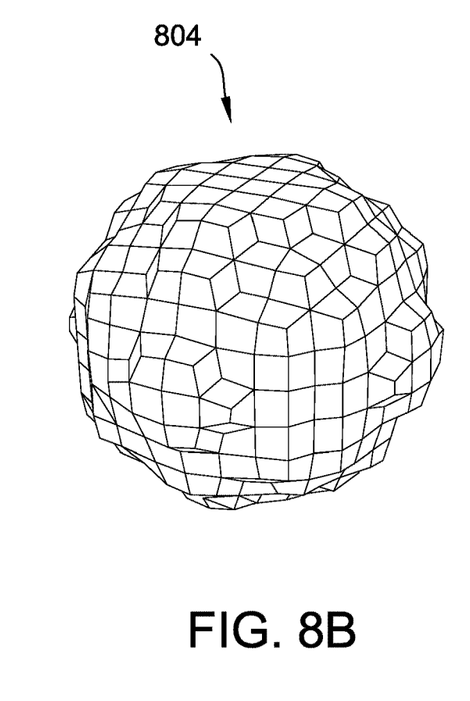
Figure 8C:
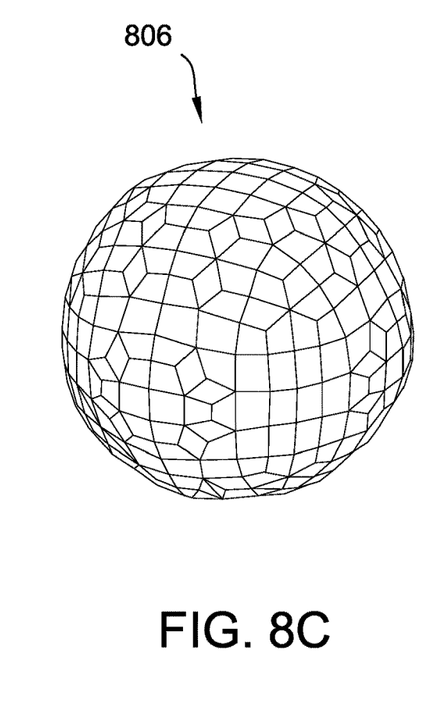

FIGS. 8A-8C illustrate operation of method 200 (shown in FIG. 2). Specifically, FIG. 8A shows a surface 802 generated with the each point located at the center of the associated cell. Notably, surface 802 has sharp corners. In contrast, FIG. 8B shows a surface 804 with the points adjusted using a point lookup table, as described herein. Notably, surface 804 is smoother than surface 802. FIG. 8C shows a surface 806 that is generated after applying multiple smoothing iterations, as described. Surface 806 is smoother than surface 804.

Figure 9A:
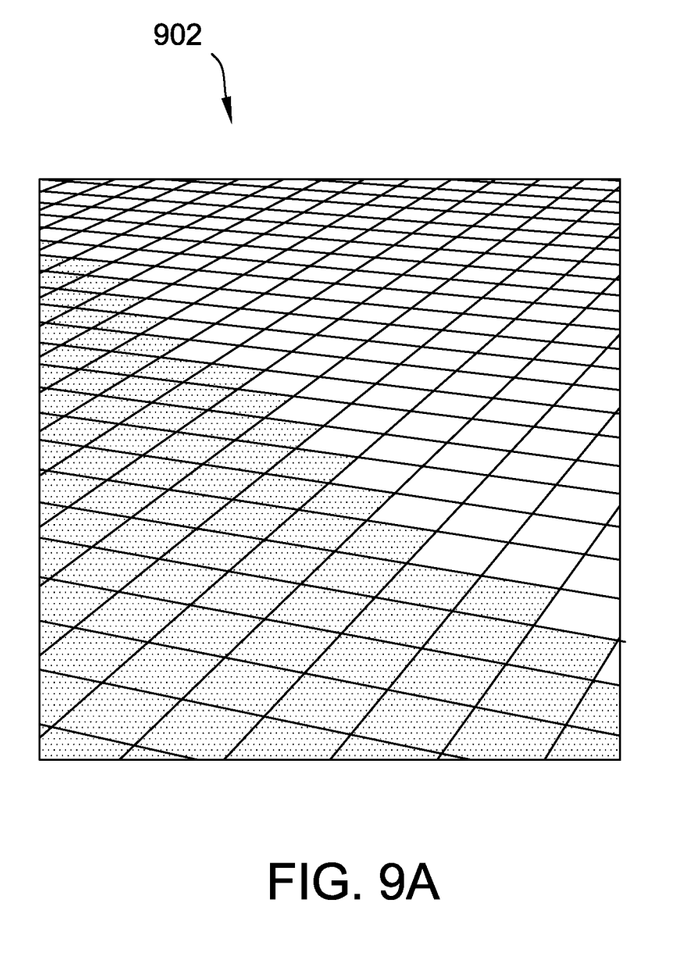
FIGS. 9A and 9B illustrate adjusting non-manifold points for smoothing using elastic relaxation.
Figure 9B:
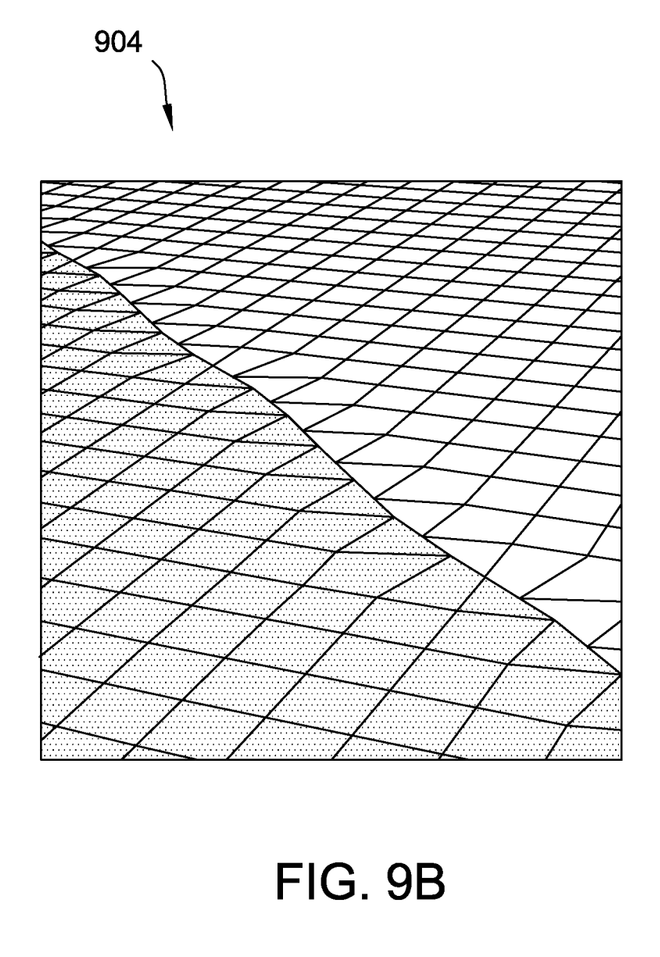

As described above, in some embodiments, non-manifold points are adjusted for smoothing using elastic relaxation, instead of curvature. FIGS. 9A and 9B illustrate the advantages of such a technique. Specifically, FIG. 9A shows a surface 902 where all points are smoothed using curvature. In contrast, FIG. 9B shows a surface 904 where non-manifold points are smoothed using elastic relaxation. Notably, surface 904 is smoother than surface 902.

The systems and methods described herein are directed to generating a three-dimensional surface from a segmented volume including a plurality of voxels, the segmented volume divided into a plurality of overlapping cells that each include eight neighboring voxels. A method includes executing a first pass over the plurality of cells to generate a list of active cells, and executing a second pass over the plurality of active cells to generate a quadrilateral mesh. The quadrilateral mesh includes a plurality of points that define a plurality of quadrilaterals. The method further includes executing at least one additional pass over the quadrilateral mesh to generate a smoothed mesh. Executing the at least one additional pass includes computing, for at least one point, a balanced curvature for the at least one point based on curvatures at points that neighbor the at least one point, and moving the at least one point to a new location based on the computed balanced curvature. The method further includes displaying the smoothed mesh.

Although certain embodiments of this disclosure have been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosure. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosure as defined in the appended claims.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. A computer-implemented method for generating a three-dimensional surface from a segmented volume including a plurality of voxels, the segmented volume divided into a plurality of overlapping cells that each include a plurality of neighboring voxels, the method comprising:
executing, using a computing device, a first pass over the plurality of cells to generate a list of active cells;
executing, using the computing device, a second pass over the plurality of active cells to generate a quadrilateral mesh, the quadrilateral mesh including a plurality of points that define a plurality of quadrilaterals, each of the plurality of points located within a corresponding active cell;
executing, using the computing device, at least one additional pass over the quadrilateral mesh to generate a smoothed mesh, wherein executing the at least one additional pass comprises:
computing, for at least one point of the plurality of points, a balanced curvature for the at least one point based on curvatures at points that neighbor the at least one point; and
moving the at least one point to a new location based on the computed balanced curvature; and
displaying, using the computing device, the smoothed mesh.

2. The method of claim 1, wherein computing a balanced curvature comprises computing the balanced curvature by averaging the curvature at the at least one point with negative curvatures at the neighboring points.

3. The method of claim 1, wherein executing a second pass comprises determining a location of each of the plurality of points within the corresponding active cell using a point displacement lookup table.

4. The method of claim 1, wherein the computing device includes a graphics processing unit (GPU).

5. The method of claim 1, wherein executing at least one additional pass comprises executing a plurality of additional passes.

6. The method of claim 1, wherein executing at least one additional pass further comprises:
identifying at least one non-manifold point of the plurality of points; and
adjusting a position of the at least one non-manifold point using elastic relaxation.

7. The method of claim 1, wherein moving the at least one point to a new location based on the computed balanced curvature comprises increasing a curvature of the at least one point while decreasing the curvatures at the neighboring points.

8. A computing device for generating a three-dimensional surface from a segmented volume including a plurality of voxels, the segmented volume divided into a plurality of overlapping cells that each include a plurality of neighboring voxels, the computing device comprising:

a memory device; and a processor communicatively coupled to the memory device, the processor configured to:
- execute a first pass over the plurality of cells to generate a list of active cells;
- execute a second pass over the plurality of active cells to generate a quadrilateral mesh, the quadrilateral mesh including a plurality of points that define a plurality of quadrilaterals, each of the plurality of points located within a corresponding active cell;
- execute at least one additional pass over the quadrilateral mesh to generate a smoothed mesh, wherein executing the at least one additional pass includes:
  - computing, for at least one point of the plurality of points, a balanced curvature for the at least one point based on curvatures at points that neighbor the at least one point; and
  - moving the at least one point to a new location based on the computed balanced curvature; and
- display, on the computing device, the smoothed mesh.

9. The computing device of claim 8, wherein to compute a balanced curvature, the processor is configured to compute the balanced curvature by averaging the curvature at the at least one point with negative curvatures at the neighboring points.

10. The computing device of claim 8, wherein to execute a second pass, the processor is configured to determine a location of each of the plurality of points within the corresponding active cell using a point displacement lookup table.

11. The computing device of claim 8, wherein the processor comprises a graphics processing unit (GPU).

12. The computing device of claim 8, wherein to execute at least one additional pass, the processor is configured to execute a plurality of additional passes.

13. The computing device of claim 8, wherein to execute at least one additional pass, the processor is further configured to:
- identify at least one non-manifold point of the plurality of points; and
- adjust a position of the at least one non-manifold point using elastic relaxation.

14. The computing device of claim 8, wherein to move the at least one point to a new location based on the computed balanced curvature, the processor is configured to increase a curvature of the at least one point while decreasing the curvatures at the neighboring points.

15. Non-transitory computer-readable media having computer-executable instructions thereon, wherein when executed by a processor of a computing device, cause the processor of the computing device to:
- execute a first pass over a plurality of overlapping cells in a segmented volume to generate a list of active cells, each cell including a plurality of neighboring voxels;
- execute a second pass over the plurality of active cells to generate a quadrilateral mesh, the quadrilateral mesh including a plurality of points that define a plurality of quadrilaterals, each of the plurality of points located within a corresponding active cell;
- execute at least one additional pass over the quadrilateral mesh to generate a smoothed mesh, wherein executing the at least one additional pass includes:
  - computing, for at least one point of the plurality of points, a balanced curvature for the at least one point based on curvatures at points that neighbor the at least one point; and
  - moving the at least one point to a new location based on the computed balanced curvature; and
- display, on the computing device, the smoothed mesh.

16. The non-transitory computer-readable media of claim 15, wherein to compute a balanced curvature, the processor is configured to compute the balanced curvature by averaging the curvature at the at least one point with negative curvatures at the neighboring points.

17. The non-transitory computer-readable media of claim 15, wherein to execute a second pass, the processor is configured to determine a location of each of the plurality of points within the corresponding active cell using a point displacement lookup table.

18. The non-transitory computer-readable media of claim 15, wherein to execute at least one additional pass, the processor is configured to execute a plurality of additional passes.

19. The non-transitory computer-readable media of claim 15, wherein to execute at least one additional pass, the processor is further configured to:
- identify at least one non-manifold point of the plurality of points; and
- adjust a position of the at least one non-manifold point using elastic relaxation.

20. The non-transitory computer-readable media of claim 15, wherein to move the at least one point to a new location based on the computed balanced curvature, the processor is configured to increase a curvature of the at least one point while decreasing the curvatures at the neighboring points.

* * * * *